(12) United States Patent
Shimoda et al.

(10) Patent No.: US 6,822,705 B2
(45) Date of Patent: Nov. 23, 2004

(54) REFLECTIVE DISPLAY, LIGHT GUIDE PLATE AND METHOD OF MANUFACTURING LIGHT GUIDE PLATE

(75) Inventors: Kazuhito Shimoda, Kanagawa (JP); Junichi Ohsako, Tokyo (JP); Yoshinari Kawashima, Kanagawa (JP); Takashi Oku, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/276,927
(22) PCT Filed: Mar. 19, 2002
(86) PCT No.: PCT/JP02/02587
§ 371 (c)(1),
(2), (4) Date: Nov. 20, 2002
(87) PCT Pub. No.: WO02/077704
PCT Pub. Date: Oct. 3, 2002

(65) Prior Publication Data
US 2003/0076465 A1 Apr. 24, 2003

(30) Foreign Application Priority Data
Mar. 22, 2001 (JP) ............................................. 2001-82037

(51) Int. Cl.[7] ............................................. G02F 1/1335
(52) U.S. Cl. .......................................... 349/62; 349/137
(58) Field of Search .................................... 349/137, 62

(56) References Cited

FOREIGN PATENT DOCUMENTS

| JP | 61-167903 | 7/1986 | | |
|---|---|---|---|---|
| JP | 879991 | 11/1998 | | |
| JP | 11-242220 | 9/1999 | | |
| JP | 2000-111702 | 4/2000 | | |
| JP | 2000-111900 | * 4/2000 | ............. | G02F/1/29 |
| JP | 2000-347041 | 9/2000 | | |
| JP | 2001-51256 | 2/2001 | | |

* cited by examiner

Primary Examiner—James A. Dudek
(74) Attorney, Agent, or Firm—Sonnenschein, Nath & Rosenthal LLP (57) ABSTRACT

Provided are a reflective liquid crystal display and a light guide plate capable of eliminating a decline in virtual contrast properties of a display screen in a reflective liquid crystal display comprising a light guide plate with a prism unit so as to display an excellent image. An antireflective film (40) is formed on a planar surface of a light guide plate (50) which is disposed so as to face a viewing side of a liquid crystal display panel (10). The antireflective film (40) inhibits its light reflection on the planar surface of the light guide plate (50). Moreover, an adhesive layer (51) is provided to improve the adhesion of the antireflective film (40) to the planar surface of the light guide plate (50).

1 Claim, 5 Drawing Sheets

| | | MATERIAL | FILM THICKNESS (nm) |
|---|---|---|---|
| ANTIREFLECTIVE FILM | FOURTH LAYER (LOW REFRACTIVE INDEX FILM) | SiO2 | 92.05 |
| | THIRD LAYER (HIGH REFRACTIVE INDEX FILM) | Nb2O5 | 119.07 |
| | SECOND LAYER (LOW REFRACTIVE INDEX FILM) | SiO2 | 33.54 |
| | FIRST LAYER (HIGH REFRACTIVE INDEX FILM) | Nb2O5 | 12.95 |
| ADHESIVE LAYER | | Si | 2.00 |

REFLECTIVE DISPLAY, LIGHT GUIDE PLATE AND METHOD OF MANUFACTURING LIGHT GUIDE PLATE

TECHNICAL FIELD

The present invention relates to a reflective display, a light guide plate and a method of manufacturing a light guide plate.

BACKGROUND ART

A typical reflective display is capable of displaying with low power consumption, and because of the property, the reflective display has been expected to be applied to a display device for an information terminal. However, in the reflective display having no light source, a displayed image cannot be viewed in a low light environment. Therefore, in recent years, a reflective display having a front light on a viewing side of a liquid crystal display panel has been proposed. For example, a wedge-shaped light guide plate comprising a top prismatic surface with a slanted portion and a planar portion which are alternately arranged and a bottom planar surface as front and back main surfaces is disposed on the viewing side of the reflective liquid crystal display panel, so that when light supplied from the light source (source light) is incident from a side surface, the source light is supplied all over the viewing side of the liquid crystal display panel, and then is reflected on a surface of a reflective plate disposed on the back surface of the liquid crystal display panel so as to be emitted to the viewing side. At this time, the amount of or the presence/absence of light emitted from the liquid crystal display panel is controlled in each pixel so as to display an image by emitting light from each pixel like a self light-emitting element. In other words, the above wedge-shaped light guide plate has both functions of a light reflector and a light transmitter.

In such a conventional wedge-shaped light guide plate, in order to sufficiently function as the light transmitter, a planar portion of the top prismatic surface is required to be substantially parallel to the bottom surface, because if the planar portion of the top prismatic surface forms a large angle with the bottom surface, light emitted from the liquid crystal display panel is refracted due to a prism effect between the bottom surface and the planar portion of the top prismatic surface, and the refracted light adversely affects image display performance as a liquid crystal display.

Moreover, in order to sufficiently function as the light reflector, the source light is guided into the light guide plate substantially in the surface direction and then is reflected at the slanted portion of the top prismatic surface so as to be entered into the liquid crystal panel almost perpendicularly. Therefore, it is desired that the slanted portion be angled at approximately 45 degrees.

However, when the planar portion and the slanted portion are alternately arranged, the thickness of the light guide plate is gradually reduced with increasing distance from the side surface where the source light is supplied, so the difference in thickness between the side surface where the source light is supplied and the other side surface is 2 to 3 mm or more, and thereby the sectional shape of the light guide plate is wedge-shaped. In such a wedge-shaped light guide plate, a wedge-shaped gap occurring between a surface of the liquid crystal display panel and the light guide plate causes parallax.

Therefore, the applicant of the invention developed a board-shaped light guide plate disclosed in Japanese Unexamined Patent Application Publication No. 2000-111900. In the board-shaped light guide plate, the top prismatic surface includes pseudo-planar portions gradually raised with increasing distance from the light source and slanted portions gradually descended with increasing distance from the light source which are repeatedly arranged, and the height of the apex of each prism is substantially uniform. Thereby, without taking the asperities of the prisms into account, the macroscopic outer shape of the light guide plate can be formed not into a wedge shape but into a board shape, and the light guide plate can sufficiently function as the light reflector and the light transmitter. Therefore, the source light can be effectively and evenly used on the surface of the liquid crystal display panel.

However, the inventors of the present invention confirmed by an experiment, etc. of displaying an image on the screen of the reflective liquid crystal display using the above board-shaped light guide plate that despite the use of the above board-shaped light guide plate, lower contrast of the image displayed on the screen of the reflective liquid crystal display might be viewed. Moreover, the inventors confirmed by various experiments and considerations that a phenomenon of such lower contrast of the displayed image occurred because stray light or the like in the board-shaped light guide plate was reflected on the planar surface of the light guide plate, and then was mixed with light involved in the original display which was reflected on the back surface of the liquid crystal display panel and emitted to outside from the viewing side. Further, it was confirmed that such light reflected on the planar surface of the board-shaped light guide plate included a large amount of light with a wavelength of approximately $\lambda=550$ nm which was equivalent to a high visible light range of human visibility, so when such light was mixed with the light involved in the original display, further lower contrast of the image was viewed on the screen.

In view of the foregoing, it is a first object of the invention to provide a reflective liquid crystal display and a light guide plate capable of eliminating a decline in virtual contrast properties of a reflective liquid crystal display using a board-shaped light guide plate such as the one disclosed in Japanese Unexamined Patent Application Publication No. 2000-111900 so as to view an excellent image. Moreover, it is a second object of the invention to provide a method of easily and reliably manufacturing such a light guide plate.

DISCLOSURE OF THE INVENTION

A reflective display according to the invention comprises a reflective liquid crystal display panel including a reflective plate on a back side, and controlling transmission of light being incident from a viewing side and then being reflected on the reflective plate toward the viewing side in each pixel so as to display; a light guide plate including a prismatic surface with a plurality of prisms formed thereon and a planar surface as front and back main surfaces of the light guide plate, and a side surface where light from a light source is supplied, the plurality of prisms being formed with a different pitch from an alignment pitch of the each pixel, the prismatic surface having a pseudo-planar portion forming an angle ranging from approximately 0.5 degrees to approximately 3.5 degrees with the planar surface and being gradually raised with increasing distance from the side surface and a slanted portion forming an angle ranging from approximately 40 degrees to approximately 60 degrees with the planar surface so as to reflect the light supplied from the side surface toward the planar surface and being gradually descended with increasing distance from the side surface, and the light guide plate being disposed so that the planar surface faces the viewing side of the liquid crystal display panel; a linear polarizing plate and a λ/4 plate disposed between the light guide plate and the liquid crystal display panel; and an antireflective film disposed on the planar surface of the light guide plate so as to inhibit light reflection on the planar surface.

Another reflective display according to the invention comprises a reflective liquid crystal display panel including a reflective plate on a back side, and controlling transmission of light being incident from a viewing side and then being reflected on the reflective plate toward the viewing side in each pixel so as to display; a light guide plate made of a synthetic resin including a prismatic surface with a plurality of prisms formed thereon and a planar surface as front and back main surfaces of the light guide plate, and a side surface where source light is supplied, the plurality of prisms being formed with a different pitch from an alignment pitch of the each pixel, the prismatic surface having a pseudo-planar portion forming an angle ranging from approximately 0.5 degrees to approximately 3.5 degrees with the planar surface and being gradually raised with increasing distance from the side surface and a slanted portion forming an angle ranging from approximately 40 degrees to approximately 60 degrees with the planar surface so as to reflect the light supplied from the side surface toward the planar surface and being gradually descended with increasing distance from the side surface, and the light guide plate being disposed so that the planar surface faces the viewing side of the liquid crystal display panel; a linear polarizing plate and a λ/4 plate disposed between the light guide plate and the liquid crystal display panel; an antireflective film disposed on the planar surface of the light guide plate so as to inhibit light reflection on the planar surface; and an adhesive layer disposed between the antireflective film and the planar surface of the light guide plate to adhere the antireflective film to a surface of the light guide plate.

A light guide plate according to the invention is disposed on a viewing side of a reflective liquid crystal display panel including a reflective plate on a back side, and controlling transmission of light being incident from a viewing side and being reflected on the reflective plate toward the viewing side in each pixel so as to display, and the light guide includes a prismatic surface with a plurality of prisms formed thereon and a planar surface as front and back main surfaces of the light guide plate, and a side surface where light from a light source is supplied, the light guide plate being made of a synthetic resin, the plurality of prisms being formed with a different pitch from an alignment pitch of the each pixel, the prismatic surface having a pseudo-planar portion forming an angle ranging from approximately 0.5 degrees to approximately 3.5 degrees with the planar surface and being gradually raised with increasing distance from the side surface and a slanted portion forming an angle ranging from approximately 40 degrees to approximately 60 degrees with the planar surface so as to reflect the light supplied from the side surface toward the planar surface and being gradually descended with increasing distance from the side surface, the light guide plate comprises: an adhesive layer made of Si with a thickness ranging from 1 nm to 10 nm on the planar surface; and an antireflective film made of a laminate including a combination of a high refractive index film using at least one selected from a $Nb_2O_5$ film, a $Ta_2O_5$ film and a $TiO_2$ film and a low refractive index film using at least one selected from the group consisting of a $SiO_2$ film and a $MgF_2$ film on a surface of the adhesive layer.

In a method of manufacturing a light guide plate according to the invention, the light guide plate is disposed on a viewing side of a reflective liquid crystal display panel including a reflective plate on a back side and controlling transmission of light being incident from a viewing side and being reflected on the reflective plate toward the viewing side in each pixel so as to display, and the method comprising the steps of: forming an adhesive layer made of Si with a thickness ranging from 1 nm to 10 nm on a planar surface of the light guide plate made of a synthetic resin through vaccum evaporation or sputtering, wherein the light guide plate includes a prismatic surface with a plurality of prisms formed thereon and the planar surface as front and back main surfaces of the light guide plate, and a side surface where light from a light source is supplied, the plurality of prisms are formed with a different pitch from an alignment pitch of the each pixel, the prismatic surface has a pseudo-planar portion forming an angle ranging from approximately 0.5 degrees to approximately 3.5 degrees with the planar surface and being gradually raised with increasing distance from the side surface and a slanted portion forming an angle ranging from approximately 40 degrees to approximately 60 degrees with the planar surface so as to reflect the light supplied from the side surface toward the planar surface and being gradually descended with increasing distance from the side surface; and forming an antireflective film made of a laminate including a combination of a high refractive index film using at least one selected from a $Nb_2O_5$ film, a $Ta_2O_5$ film and a $TiO_2$ film and a low refractive index film using at least one selected from the group consisting of a $SiO_2$ film and a $MgF_2$ film on a surface of the adhesive layer so as to inhibit light reflection on the planar surface of the light guide plate.

In the reflective display according to the invention, the light guide plate includes a prismatic surface with a plurality of prisms formed thereon and a planar surface as front and back main surfaces thereof, and a side surface where light from a light source is supplied. The plurality of prisms are formed with a different pitch from an alignment pitch of each pixel. The prismatic surface has a pseudo-planar portion forming an angle ranging from approximately 0.5 degrees to approximately 3.5 degrees with the planar surface, and being gradually raised with increasing distance from the side surface and a slanted portion forming an angle ranging from approximately 40 degrees to approximately 60 degrees with the planar surface so as to reflect light supplied from the side surface toward the planar surface, and being gradually descended with increasing distance from the side surface. The reflective display, the light guide plate, or the method of manufacturing the light guide plate according to the invention comprises an antireflective film disposed on the planar surface of the light guide plate, which faces the viewing side of the liquid crystal display panel, so the antireflective film inhibits light reflection on the planar surface of the light guide plate.

The word "approximately" is added before the amounts of the angle which the pseudo-planar portion forms with the planar surface and the angle which the slanted portion forms with the planar surface in the above light guide plate, because even if the angle is set at 0.5 degrees or 40 degrees as a set value, an error of a few percents is often introduced during manufacturing. Therefore, in order to take account of such error, the word "approximately" is added.

Moreover, in another reflective display according to the invention, the light guide plate is specifically made of a synthetic resin, and another reflective display is equivalent the above reflective display further comprising an adhesive layer formed between the antireflective film and the planar surface of the light guide plate. The adhesive layer adheres the antireflective film to the light guide plate.

In the light guide plate according to the invention, an adhesive layer made of Si with a thickness ranging from 1 nm to 10 nm is formed on the planar surface of the light guide plate made of a transparent synthetic resin. Further, the antireflective film is made of a laminate including a combination of a high refractive index film using at least one selected from a $Nb_2O_5$ film, a $Ta_2O_5$ film and a $TiO_2$ film and a low refractive index film using at least one selected from the group consisting of a $SiO_2$ film and a $MgF_2$ film. The antireflective film is firmly adhered to the planar surface of the light guide plate with the adhesive layer in between.

The method of manufacturing a light guide plate according to the invention comprises the steps of forming the adhesive layer made of Si with a thickness ranging from 1 nm to 10 nm on the planar surface of the light guide plate made of a synthetic resin through vaccum evaporation or sputtering, and forming an antireflective film made of a laminate including a combination of a high refractive index film using at least one selected from the group consisting of a $Nb_2O_5$ film, a $Ta_2O_5$ film and a $TiO_2$ and a low refractive index film using at least one selected from the group consisting of a $SiO_2$ film and a $MgF_2$ film on the surface of the adhesive layer so as to inhibit light reflection on the planar surface of the light guide plate. As the adhesive layer is disposed between the planar surface of the light guide plate and the antireflective film, an interface of the planar surface of the light guide plate and an interface of the antireflective film are firmly adhered each other.

Other and further objects, features and advantages of the invention will appear more fully from the following description.

BEST MODE FOR CARRYING OUT THE INVENTION

A preferred embodiment of the present invention will be described in more detail below referring to the accompanying drawings.

Figure 1:
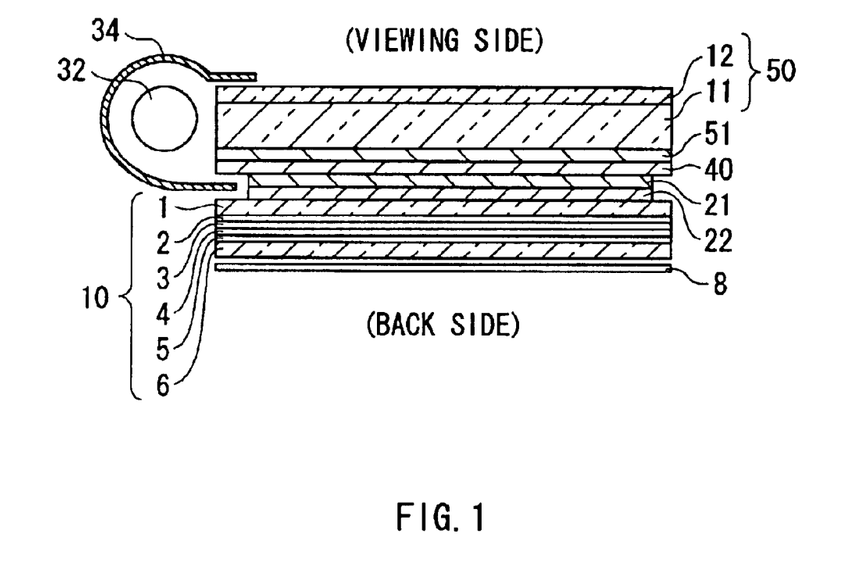
FIG. 1 is a schematic cross sectional view showing the configuration of a reflective display according to an embodiment of the invention.
Figure 2:
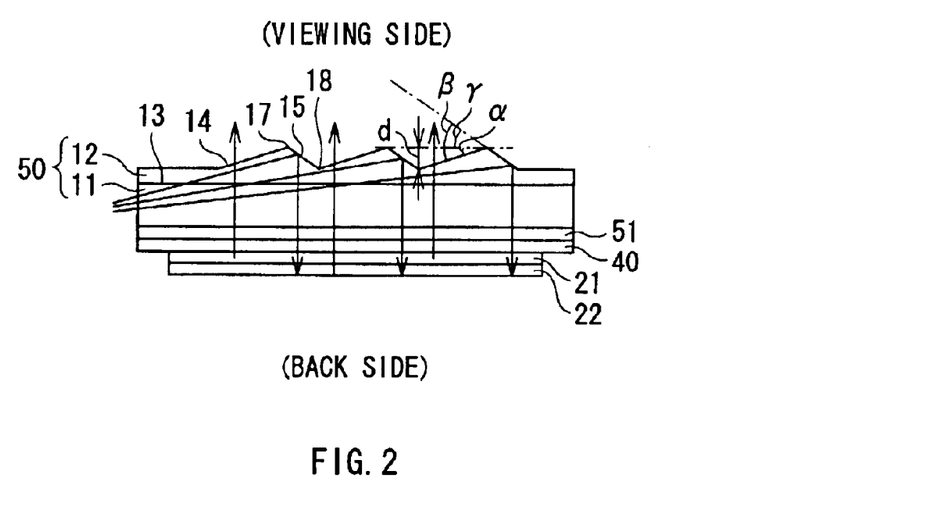
FIG. 2 is an enlarged view mainly showing a light guide plate in FIG. 1.

FIG. 1 shows a schematic cross sectional view of the configuration of a reflective display according to an embodiment of the invention, and FIG. 2 is an enlarged view mainly showing a light guide plate in FIG. 1.

The reflective display mainly comprises a liquid crystal display panel 10, a linear polarizer 21, a λ/4 plate 22, and a light guide plate 50 including an adhesive layer 51 and an antireflective film 40. Incidentally, the liquid crystal display panel 10 and the light guide plate 50 (without the adhesive layer and the antireflective layer) can be equivalent to those disclosed in Japanese Unexamined Patent Application Publication No.2000-111900 by the applicant of the invention. As the main components, the liquid crystal display panel 10 includes a liquid crystal layer held by sandwiching between a pair of glass substrates 1 and 6 facing each other with a predetermined gap, and a sealing material (not shown) sealing the surroundings. On a surface of the glass substrate 1, a color filter 2 and a transparent electrode (common electrode) 3 are formed. On a surface of the other glass substrate 6, a pixel electrode 5 is formed. As a pixel electrode of an active matrix liquid crystal display panel, the pixel electrode 5 is connected with, for example, an insulated gate transistor (not shown). Needless to say, as the liquid crystal display panel 10, not only the active matrix liquid crystal display panel but also a simple matrix liquid crystal display panel or the like can be used. On the bottom of the liquid crystal display panel 10, a reflective plate 8 is disposed. Incidentally, the reflective plate 8 can be formed inside the liquid crystal display panel 10. For example, as the reflective plate 8, a reflective mirror may be formed under the pixel electrode 5, or a reflective mirror surface may be formed on the bottom surface of the glass substrate 6.

The light guide plate 50 mainly includes a polymer substrate body portion 11 having a substantially flat bottom surface and a uniform thickness in the surface and a prism unit 12 having a plurality of prismatic protuberances formed on a viewing side (on the top side in FIG. 1) of the polymer substrate body portion 11 as main components. In FIG. 1, on the left side surface of the light guide plate, for example, a light source 32 using a blue LED and a white conversion filter, and a reflector 34 for effectively entering source light emitted from the light source 32 into the side surface of the light guide plate 50 are disposed. The polymer substrate body portion 11 and the prism unit 12 may be separately formed and bonded together so as to form the light guide plate 50, or the polymer substrate body portion 11 and the prism unit 12 may be formed as a connected (one) part made of an ultraviolet cure resin or the like.

More specifically, as shown in FIG. 2, the prism unit 12 of the light guide plate 50 includes a plurality of prisms (prismatic protuberances) each of which has a pseudo-planar portion 14 gradually raised with increasing distance from the light source 32 and a slanted portion 15 gradually descended with increasing distance from the light source 32 on the viewing side of the prism unit 12. Although the whole light guide plate 50 may be made of a transparent material such as acrylic, in order to form a more precise prismatic shape, the prism unit 12 is preferably made of a material having good plasticity. For example, the polymer substrate body portion 11 is made of an acrylic plate, and the prism unit 12 is made of an ultraviolet cure resin, so that the ultraviolet cure resin can be easily and precisely formed into the prismatic shape of the prism unit 12 by a stamper or the like. However, the materials and the forming method of the light guide plate 50 are not limited to the above, and, for example, the polymer substrate body portion 11 and the prism unit 12 can be made of, for example, ARTON (a product name manufactured by JSR Corporation) of PO (polyolefin base) through being molded in one piece.

The linear polarizer 21 forms linearly polarized light including an x-component and a y-component each having the same strength. The λ/4 plate 22 introduces a phase lag of λ/4 to either the x-component or the y-component. Light passing through the linear polarizer 21 and the λ/4 plate 22 is emitted as circularly polarized light. The light emitted in such a manner is reflected on a lower interface of the λ/4 plate 22 or on a surface of the glass substrate 1 in the liquid crystal display panel 10 disposed on the viewing side, and is turned to the opposite direction while maintaining its polarization state. Then when the light passes through the λ/4 plate 22 again, a polarization axis is rotated 90 degrees, so that the light is blocked by the linear polarizer 21. Accordingly, in theory, it is designed that the light reflected on the lower interface of the λ/4 plate 22 or the surface of the glass substrate 1 in the liquid crystal display panel 10 disposed on the viewing side does not return to the light guide plate 50.

However, in reality, the inventors of the present invention confirmed that in the case of, for example, a reflective liquid crystal display disclosed in Japanese Unexamined Patent Application Publication No. 2000-111900, while light supplied from a side surface of the light guide plate was guided farther, stray light was generated due to diffused reflection in the light guide plate 50 or the like, and the stray light was reflected on an interface of the planar surface of the light guide plate 50 (on the bottom side in FIGS. 1 and 2), and was mixed with reflected light which was reflected on the reflective plate 8 disposed on the back surface of the liquid crystal display panel 10 and was involved in the original display, and thereby the apparent contrast of an display image viewed from the viewing side might decline.

In order to prevent such reflected light on the interface of the planar surface (a surface on the far side from the viewing side) of the light guide plate 50, the antireflective film 40 is disposed on the planar surface of the light guide plate 50 with the adhesive layer 51 in between. Further, the antireflective film 40 often has poor adhesion to the planar surface of the light guide plate 50 made of a transparent synthetic resin or the like, so the adhesive layer 51 is provided to enhance the adhesion of the antireflective film 40 to the planar surface of the light guide plate 50 made of, for example, a transparent synthetic resin such as an ultraviolet cure resin or an acrylic resin.

Source light which is guided from the left side surface to the right in the light guide in FIGS. 1 and 2 is reflected on the slanted portion 15 of each prismatic protuberance, and almost perpendicularly turns toward the bottom surface of the liquid crystal display panel 10. The slanted portion 15 is positioned so as to have an angle of approximately 45 degrees with a horizontal surface in the drawings, so the light almost horizontally traveling from the left to the right is reflected so as to almost perpendicularly enter into the liquid crystal display panel 10. The traveling direction of light from the light source 32 is not completely horizontal, so in order to turn the light reflected on each slanted portion 15 toward the direction precisely perpendicular to the liquid crystal display panel 10, the angle of the slanted portion 15 is selected within a range from approximately 40 degrees to 60 degrees.

The light passing through the liquid crystal display panel 10 and reflected on the reflective plate 8 travels from the bottom to the top in FIGS. 1 and 2, and then enters into the light guide plate 50 via the λ/4 plate 22 and the linear polarizer 21. In the light guide plate 50, a pseudo-planar portion 14 which has an almost horizontal surface is an emitting surface, so the light involved in displaying is emitted forward of the viewing side (toward a viewer) from the pseudo-planar portion 14. The viewer (a user of the reflective liquid crystal display or the like) can see an image through viewing the light emitted from the light guide plate 50. As described above, the angles of the slanted portions 15 are set within a range approximately from 40 degrees to 60 degrees, so most of the light guided inside the light guide plate 50 has a large incident angle so that the whole light is reflected on the slanted portions 15.

The light guide plate 50 is desired to have substantially uniform intensity as a whole. The light source 32 is disposed along one side of the light guide plate 50, and the light from the light source 32 travels from the left to the right in the light guide plate 50. When the prismatic shapes formed on the prism unit 12 of the light guide plate 50 are uniform, the solid angle of the light entering into each prism gradually decreases toward the left. In order that the light guide plate obtains uniform intensity as a whole, it is not suitable to form the same-shaped prisms. Therefore, the pseudo-planar portion 14 has a shape raised with increasing distance from the light source while positioning almost parallel to the bottom surface 13. For example, the pseudo-planar portion 14 is formed so as to have an angle of approximately 1.5 degrees with respect to the horizontal surface.

As described above, the slanted portions 15 reflect the light traveling from the left to the right in the light guide plate 50 so as to guide the light toward the reflective liquid crystal display. The amount of the light entering into each prism per unit area gradually decreases toward the right in the light guide plate 50. Therefore, it is desired that the areas of the slanted portions 15 gradually increase toward the right. In order to increase the areas of the slanted portions 15, it is preferable that a difference d in height between an apex 17 and a bottom 18 of the prism (hereinafter referred to as depth) gradually increases from the left to the right in the light guide plate.

Moreover, the average angle of the light entering into the slanted portions 15 gradually decreases from the left to the right in the light guide plate 50. Therefore, an angle γ which the slanted portion 15 forms with the horizontal surface may be changed. For example, it is effective to change the angle γ within a range from approximately 40.5 degrees to approximately 44.5 degrees. Incidentally, an angle β which is the sum of an angle α which the pseudo-planar portion 14 forms with the horizontal surface and the angle γ which the slanted portion 15 forms the horizontal surface varies within a range from approximately 42.5 degrees to approximately 46 degrees. When the light traveling from the slanted portions 15 to the liquid crystal display panel 10 is slightly (for example, approximately ±5 degrees) shifted from the perpendicular direction, the screen becomes brighter, and the contrast becomes higher. The pitch of the prism is preferably within a range from 100 μm to 500 μm, more preferably within a range from 200 μm to 300 μm. The depth d of the prism is preferably within a range from 1 μm to 15 μm. Moreover, the depth d of the prism is set so that the intensity of the light reflected on the slanted portions 15 and perpendicularly emitted from the planar surface in the farthest position from a light-incoming portion (a side surface where the source light is supplied) is 1.3 times to 2 times higher than that in the nearest position from the light-incoming portion.

Figure 3:
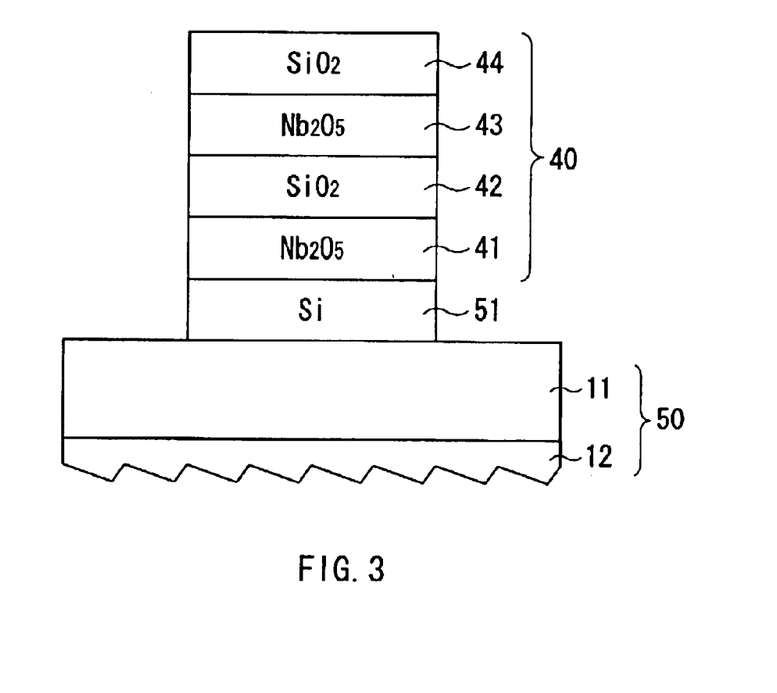
FIG. 3 is a schematic view showing the more detailed configuration of an adhesive layer and an antireflective film included in the light guide plate according to the embodiment of the invention.

FIG. 3 schematically shows the configuration of the adhesive layer and the antireflective film disposed on the light guide plate according to the embodiment of the invention in more detail. FIG. 3 shows the light guide plate 50 in FIGS. 1 and 2 turned upside down.

On the planar surface of the light guide plate 50 (a top surface of the polymer substrate body portion 11 in FIG. 3), the adhesive layer 51 and the antireflective film 40 are laminated in this order. More specifically, the antireflective film 40 includes a high refractive index film 41 made of $Nb_2O_5$ as a first layer, a low refractive index film 42 made of $SiO_2$ as a second layer, a high refractive index film 43 made of $Nb_2O_5$ as a third layer and a low refractive index film 44 made of $SiO_2$ as a fourth layer which are laminated in this order. The antireflective film 40 is formed of a combination of the low refractive index films and the high refractive index films with required film thicknesses. The practical layer number of the antireflective film 40 ranges from two layer, that is, a combination of one low refractive index film and one high refractive index film to 5 or 6 layers in total, that is, about three combinations of one low refractive index film and one high refractive index. When the antireflective film 40 has too many layers, such a thick antireflective film 40 may cause lower efficiency of the source light, such as attenuation of the light involved in displaying, or a lower throughput of the antireflective film 40 during its manufacturing process.

The configuration of the antireflective film 40 is not necessarily limited to a laminate including an even number of layers with one or more combinations of a low refractive index film and a high refractive index film. A property of inhibiting the reflected light is determined by a balance between a difference in refractive index between the low refractive index film and the high refractive index film and the thickness of each of the films. In addition to a factor of such difference in refractive index, a factor of the thicknesses of the low refractive index film and the high refractive index film is involved in a function of inhibiting reflection. Further, there is a tendency that the more layers with different optical functions are laminated, the wider wavelength range of reflected light can be inhibited. Therefore, depending upon such difference in refractive index or the adjustment to the thickness of each film, the antireflective film 40 can have a laminate including five layers (an odd number of layers) with three low refractive index films and two high refractive index films which are alternately arranged, so it is not necessarily limited to a combination of a low refractive index film and a high refractive index film.

The properties required for the materials of the polymer substrate body portion 11 and the prism unit 12 includes high transparency and less occurrence of optical distortion because they are used for the display. Further, in addition to these conditions, the materials are required to have high durability against environment to which the materials are exposed during a step of forming the adhesive layer 51 or the antireflective film 40 on the planar surface of the polymer substrate body portion 11 or during an extended period of use or against mechanical stress and high reliability. Specifically, the minute prism unit 12 is required to be formed into a precise shape, so the materials are required to have good formability. The materials satisfying such conditions include, for example, an ultraviolet cure resin and an acrylic resin, which are described above, as well as a high polymer such as PO (polyolefin), PC (polycarbonate) and PET (polyolefinterephthalate). In addition, various high polymeric materials having the above described optical properties or durability can be used.

The adhesive layer 51 is disposed between the planar surface of the polymer substrate body portion 11 and the antireflective film 40 so as to have firm (secure) adhesion between the planar surface of the polymer substrate body portion 11 and the antireflective film 40. In order to have such adhesion, a Si film is preferably formed so as to have a thickness ranging from 1 nm to 10 nm inclusive. If the Si film has a thickness of less than 1 nm, it is difficult to obtain sufficient adhesion, and if the Si film has a thickness exceeding 10 nm, the light transmittance in the adhesive film 51 declines, and thereby the light involved in displaying is attenuated. From this point of view, in Example which is described later, the adhesive layer 51 made of the Si film has a thickness of 2 nm. The thickness of the adhesive layer 51 is set at a suitable amount so that the adhesion between the planar surface of the polymer substrate body portion 11 and the antireflective film 40 during film formation and the adhesion between them can be better while maintaining excellent light transmittance.

Like Example which is described later, a 0.8 mm-thick substrate made of ARTON (product name of a polymer substrate material manufactured by JSR Corporation) is prepared as a polymer substrate body portion 11, and on a planar surface of the substrate, for example, a 2 nm-thick Si film is formed through sputtering, and thereby the adhesive layer 51 can be formed.

As the materials of the first layer, the high refractive index film 41, and the third layer, the high refractive index film 43, in the antireflective film 40, $Nb_2O_5$, $Ta_2O_5$, $TiO_2$ or the like is preferably used. Further, as the materials of the second layer, the low refractive index film 42, and the fourth layer, the low refractive index film 44, $SiO_2$, $MgF_2$ or the like is preferably used. Needless to say, the materials of the films are not limited to those. As in the case of the adhesive layer 51, the high refractive index films 41 and 43 and the low refractive index films 42 and 44 are preferably formed through sputtering by an in-line sputtering system which is used to form the above adhesive layer 51, because the productivity can be improved. More specifically, the high refractive index films 41 and 43 and the low refractive index films 42 and 44 are preferably formed through AC (alternating current) sputtering in an atmosphere of Ar (argon) and $O_2$ (oxygen), because by the use of AC sputtering, the occurrence of abnormal discharge which may occur when the films are formed through DC sputtering can be prevented, and thereby stable film formation can be carried out.

EXAMPLE

Figure 4:
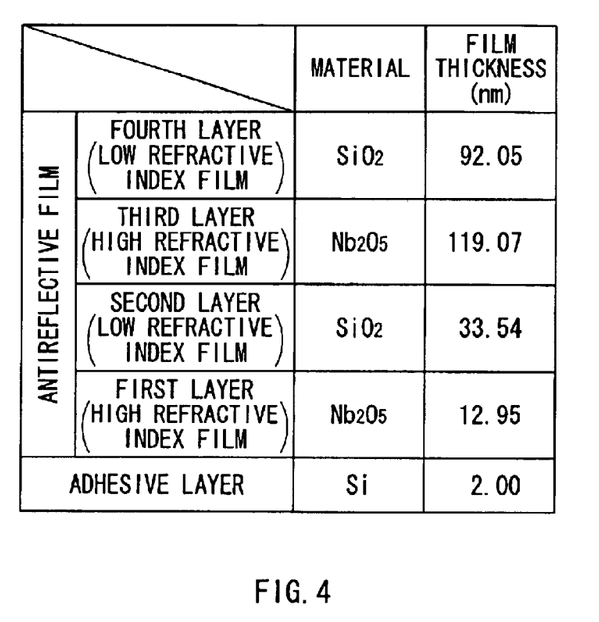
FIG. 4 is a table showing the materials and the film thicknesses of the antireflective film and the adhesive layer in Example.

The antireflective film 40 and the adhesive layer 51 made of the materials described in the above embodiment with the thicknesses indicated in FIG. 4 were formed and laminated on the planar surface of the light guide plate 50 through AC sputtering by the in-line sputtering system. The light guide plate 50 of Example on which the antireflective film 40 and the adhesive layer 51 were formed in such a manner was mounted on the reflective liquid crystal display panel 10 having the configuration described in the above embodiment, and the apparent intensity of the screen in a fully on state and in a fully off state was determined to confirm the ratio (%) of the amount of the reflected light not involved in displaying, assuming that the source light was 100 (%). Moreover, the apparent intensity of the screen of the reflective liquid crystal display without the antireflective film 40 and the adhesive layer 51, which was equivalent to the display disclosed in Japanese Unexamined Patent Application Publication No. 2000-111900, in the fully on state and in the fully off state was determined to confirm the ratio of the amount of the reflected light not involved in displaying. Then, the ratios of the amount of the reflected light not involved in displaying and the apparent contrast properties of the screen in the both displays were compared.

Figure 5:
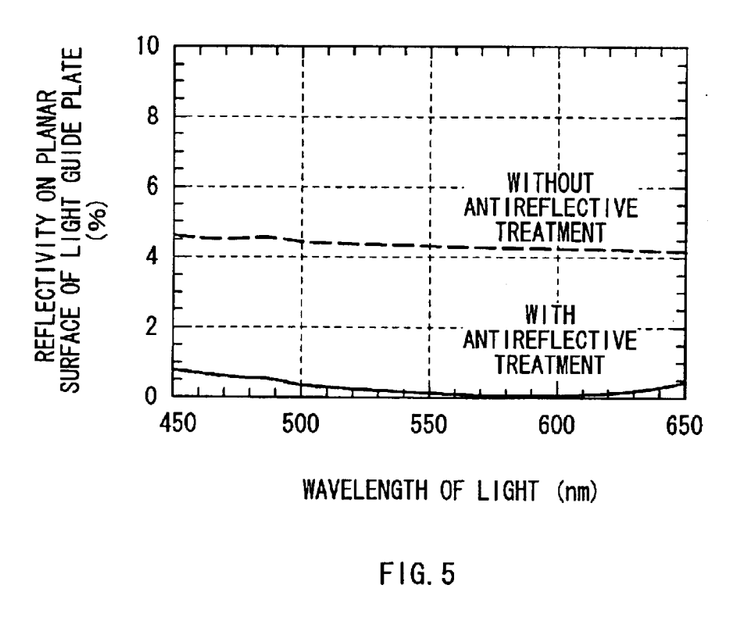
FIG. 5 is a graph of ratios of reflected light not involved in displaying in the case where the antireflective film and the adhesive layer are not included and the case where they are included.

As a result, as shown in FIG. 5, in the reflective liquid crystal display without the antireflective film 40 and the adhesive layer 51, the ratio of the reflected light not involved in displaying was approximately 4% to 5%, on the other hand, in the reflective liquid crystal display with the antireflective film 40 and the adhesive layer 51, the ratio of the amount of the reflected light was approximately 0.5%. Accordingly, it was confirmed that the reflection of the light not involved in displaying was very effectively prevented in almost the whole wavelength range (from 450 nm to 650 nm) of visible light involved in displaying. More specifically, as shown in FIG. 5, the light in a range from 550 nm to 600 nm which was the main wavelength range of the reflected light not involved in displaying was inhibited to nearly 0%.

Figure 7:
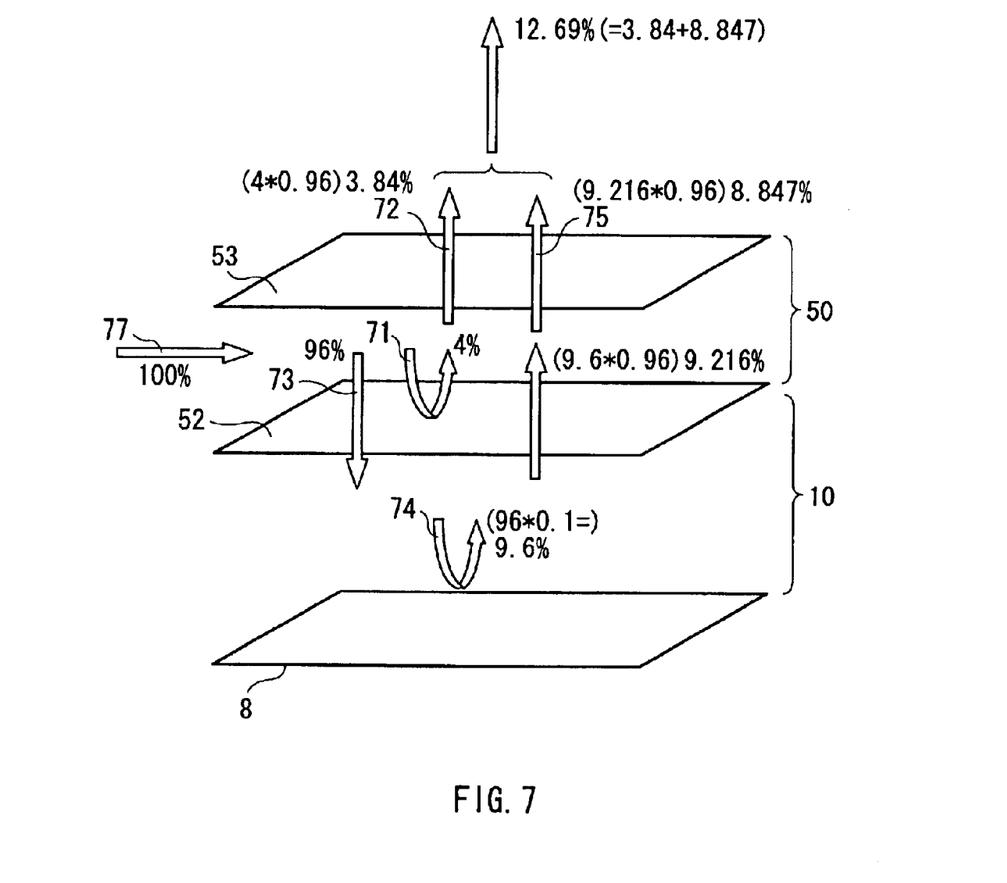
FIG. 7 is a schematic view showing an optical action in a reflective liquid crystal display without the antireflective film and the adhesive layer.

More specifically, in the reflective liquid crystal display without the antireflective film 40 and the adhesive layer 51, as schematically shown in FIG. 7, reflected light 71 not involved in displaying which was reflected on the bottom surface (planar surface) 52 of the light guide plate 50 was 4% of source light 77. The reflected light 71 was multiplied by the transmittance of 0.96 when the light 71 was emitted from inside of the light guide plate 50 to outside, so reflected light 72 not involved in displaying which was finally viewed from the top surface (viewing side) 53 of the light guide plate 50 was 4×0.96=3.84%. Further, light 73 emitted from the bottom surface 52 of the light guide plate 50 to outside was 96%. Light 74 passed through the liquid crystal display panel 10, and was reflected on the reflective plate 8 toward the liquid crystal display panel 10 in the direction opposed to the light 73, and then entered into the bottom surface 52 of the light guide plate 50, so the light 74 was equal to the light 73 multiplied by the transmittance of 0.1 including the transmittance of the liquid crystal display panel 10 and the reflectance of the reflective plate 8, that is, 96×0.1=9.6%. Moreover, light 75 finally emitted from the top surface 53 of the light guide plate 50 toward the front of the viewing side was equal to the light 74 multiplied by the transmittance of 0.96 at the interface of the light guide plate 50 between inside and outside twice (because the light passed through the interface of the light guide plate 50 twice from outside to inside and from inside to outside), that is, 9.6×0.96×0.96= 8.847%.

Therefore, the intensity of the screen when the liquid crystal display panel 10 was in the fully off state (dark state) corresponded to the amount of the reflected light not involved in displaying, that is, 3.84%, assuming that the source light 77 was 100%. Further, the intensity of the screen when the liquid crystal display panel 10 was in the fully on state (bright state) corresponded to the light of 3.84%+8.847%=12.69%. The apparent contrast ratio of the reflective liquid crystal display without the antireflective film 40 and the adhesive layer 51 calculated by the amounts of light in the bright state and in the dark state was 12.69/3.84=3.30.

Figure 6:
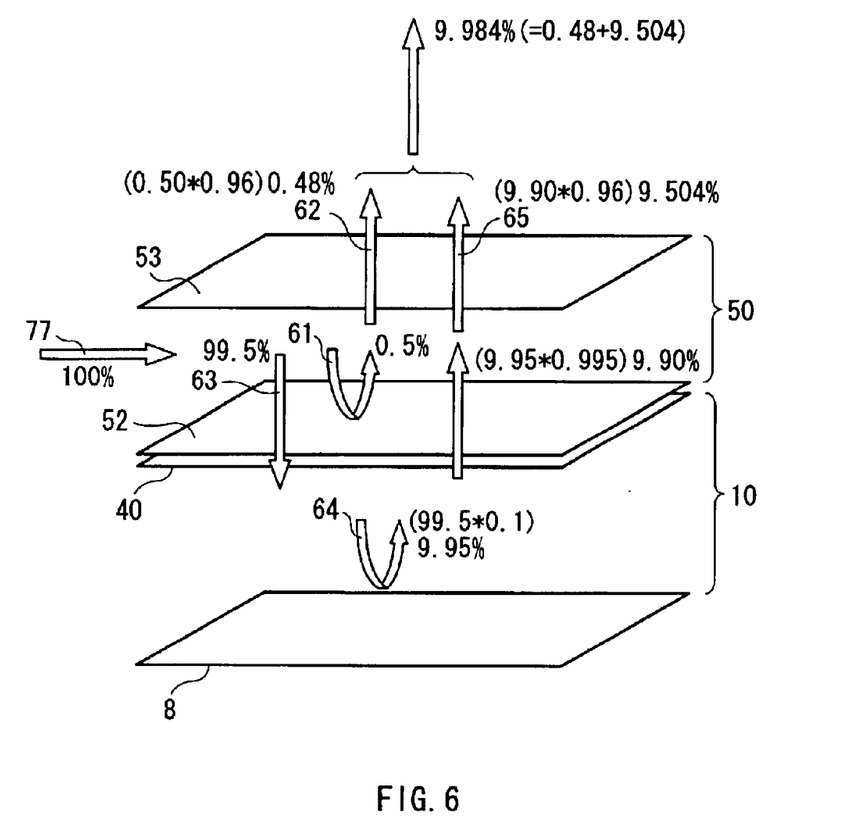
FIG. 6 is a schematic view showing an optical action in a reflective liquid crystal display with the antireflective film and the adhesive layer.

On the other hand, in the reflective liquid crystal display with the antireflective film 40 and the adhesive layer 51, as schematically shown in FIG. 6, reflected light 61 not involved in displaying which was reflected on the bottom surface 52 of the light guide plate 50 was inhibited from being reflected by the antireflective film 40 so as to have an amount of light of 0.5%. Reflected light 62 not involved in displaying which was finally viewed from the top surface (viewing side) 53 of the light guide plate 50 was equal to the reflected light 61 multiplied by the transmittance of 0.96 when the reflected light 61 was emitted from inside of the light guide plate 50 to outside, that is, an amount of light of 0.5×0.96=0.48%. Further, light 63 emitted from the bottom surface 52 of the light guide plate 50 to outside was an amount of light of 99.5%. Light 64 passed through the liquid crystal display panel 10, and was reflected on the reflective plate 8 toward the liquid crystal display panel 10 in the direction opposed to the light 63, and then entered into the bottom surface 52 of the light guide plate 50, so the light 64 was equal to the light 63 multiplied by the transmittance of 0.1 including the transmittance of the liquid crystal display panel 10 and the reflectance of the reflective plate 8, that is, 99.5×0.1=9.95%. Moreover, light 65 finally viewed on the top surface 53 of the light guide plate 50 was equal to the light 64 multiplied by the transmittances of 0.995 (from outside to inside) and 0.96 (from inside to outside) in the interface of the light guide plate 50 between inside and outside, that is, an amount of light of 9.95×0.995×0.96= 9.504%.

Therefore, the intensity of the screen when the liquid crystal display panel 10 was in the fully off state corresponded to the amount of the reflected light not involved in displaying, that is, 0.48%. The intensity of the screen when the liquid crystal display panel 10 was in the fully on state corresponded to the amount of light of 0.48+9.504%= 9.984%. Accordingly, the apparent contrast ratio of the reflective liquid crystal display with the antireflective film 40 and the adhesive layer 51 calculated by the amounts of light in the bright state and the dark state was 9.984/0.48= 20.8, which was approximately 6 times larger than the apparent contrast ratio of 3.30 in the above reflective liquid crystal display without the antireflective film 40 and the adhesive layer 51, so the apparent contrast ratio (contrast property) was remarkably improved.

Next, a high temperature and high humidity storage test under a temperature of 60° C. and a humidity of 90%RH for 240 hours was carried out on the light guide plate 50 of Example on which the antireflective film 40 and the adhesive layer 51 were formed to check its durability. As a result, after the predetermined test time of 240 hours elapsed, no change in optical properties, no physical damage and no peeling in the antireflective film 40, adhesive layer 51 and the light guide plate 50 were detected. On the other hand, when the same high temperature and high humidity storage test was carried out on the light guide plate 50 including the antireflective film 40 formed directly on the planar surface of the light guide plate 50 without the adhesive layer 51, the antireflective film 40 was peeled from the planar surface of the light guide plate 50 before a lapse of the predetermined 240 hours. As a result of the high temperature and high humidity storage tests on the light guide plate 50 with the adhesive layer and the light guide plate 50 without the adhesive layer, it was confirmed that the adhesive layer 51 functioned extremely effectively, so that the light guide plate 50 with the adhesive layer 51 had firm adhesion of the antireflective film 40 to the planar surface of the light guide plate 50 and strong durability.

Further, in the above embodiment, although the case where a $Nb_2O_5$ film as the high refractive index film is formed directly on the adhesive layer and a $SiO_2$ film as the low refractive index film is formed on the high refractive index film is described as an example, the $SiO_2$ film as the low refractive index film and the $Nb_2O_5$ film as the high refractive index film can be laminated on the adhesive layer in this order. Moreover, as the materials of the antireflective film, the adhesive layer or the light guide plate, the above-described materials are preferably but not exclusively used, so any other materials are applicable.

As described above, according to the reflective display, the light guide plate or a method of manufacturing the light guide plate of the invention, the light guide plate includes a prismatic surface with a plurality of prisms formed thereon and a planar surface as front and back main surfaces thereof, and a side surface where light from a light source is supplied. The plurality of prisms are formed so as to have a different pitch from an alignment pitch of each pixel. The prismatic surface has a pseudo-planar portion forming an angle ranging from approximately 0.5 degrees to approximately 3.5 degrees with the planar surface and being gradually raised with increasing distance from the side surface and a slanted portion forming an angle ranging from approximately 40 degrees to approximately 60 degrees with the planar surface so as to reflect light supplied from the side surface toward the planar surface, and being gradually descended with increasing distance from the side surface. The reflective display, the light guide plate, or the method of manufacturing the light guide plate of the invention comprises an antireflective film disposed on the planar surface of the light guide plate, which faces the viewing side of the liquid crystal display panel, so as to inhibit light reflection on the planar surface of the light guide plate, so reflected light on the planar portion of the light guide plate such as stray light or the like apart from for reflected light involved in displaying is inhibited so as to improve the apparent contrast property.

Moreover, according to the reflective display, the light guide plate or a method of manufacturing the light guide plate of an aspect of the invention, the light guide plate is specifically formed of a synthetic resin, and the adhesive layer is formed between the antireflective film and the planar surface of the light guide plate so as to adhere the antireflective film to the planar surface of the light guide plate, so an interface of the planar surface of the light guide plate and an interface of the antireflective film can be firmly adhered each other. Thereby, the occurrence of manufacturing inconvenience that, for example, the antireflective film cannot be formed so as to be adhered to the planar surface of the light guide plate or inconvenience in use that, for example, the antireflective film is peeled from the planar surface of the light guide plate can be prevented.

Obviously many modifications and variations of the present invention are possible in the light of the above teachings. It is therefore to be understood that within the scope of the appended claims the invention may be practiced otherwise than as specifically described.

What is claimed is:

1. A reflective display, comprising:
    a reflective liquid crystal display panel including a reflective plate on a back side, and controlling transmission of light being incident from a viewing side and then being reflected on the reflective plate toward the viewing side in each pixel so as to display;
    a light guide plate including a prismatic surface with a plurality of prisms formed thereon and a planar surface as front and back main surfaces of the light guide plate, and a side surface where light from a light source is supplied, the plurality of prisms being formed with a different pitch from an alignment pitch of the each pixel, the prismatic surface having a pseudo-planar portion forming an angle ranging from approximately 0.5 degrees to approximately 3.5 degrees with the planar surface and being gradually raised with increasing distance from the side surface and a slanted portion forming an angle ranging from approximately 40 degrees to approximately 60 degrees with the planar surface so as to reflect the light supplied from the side surface toward the planar surface and being gradually descended with increasing distance from the side surface, and the light guide plate being disposed so that the planar surface faces the viewing side of the liquid crystal display panel;
    a linear polarizing plate and a $\lambda/4$ plate disposed between the light guide plate and the liquid crystal display panel;
    an adhesive layer made of Si with a thickness ranging from 1 nm to 10 nm on the planar surface of the light guide plate; and
    an antireflective film made of a laminate including a combination of a high refractive index film using at least one selected from a Nb2O5 film, a Ta2O5 film and a TiO2 film and a low refractive index film using at least one selected from the group consisting of a SiO2 film and a MgF2 film on a surface of the adhesive layer.

* * * * *